(12) United States Patent
Sugiura et al.

(10) Patent No.: US 8,324,850 B2
(45) Date of Patent: Dec. 4, 2012

(54) MOTOR DRIVER

(75) Inventors: Kenji Sugiura, Osaka (JP); Masahiro Yasohara, Hyogo (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 12/279,404

(22) PCT Filed: May 17, 2007

(86) PCT No.: PCT/JP2007/060561
§ 371 (c)(1),
(2), (4) Date: Aug. 14, 2008

(87) PCT Pub. No.: WO2007/136104
PCT Pub. Date: Nov. 29, 2007

(65) Prior Publication Data
US 2009/0021197 A1   Jan. 22, 2009

(30) Foreign Application Priority Data

May 18, 2006   (JP) .................................. 2006-138454

(51) Int. Cl.
*H03K 5/00* (2006.01)
(52) U.S. Cl. .................. 318/400.2; 318/400.01; 318/700
(58) Field of Classification Search ............... 318/400.2, 318/400.01, 700
See application file for complete search history.

(56) References Cited

U.S. PATENT DOCUMENTS

| | | | |
|---|---|---|---|
| 4,546,293 A | 10/1985 | Peterson et al. | |
| 5,200,675 A | 4/1993 | Woo | |
| 5,850,130 A * | 12/1998 | Fujisaki et al. | 318/400.2 |
| 5,872,435 A | 2/1999 | Bolte et al. | |
| 2003/0020428 A1 * | 1/2003 | Masaki et al. | 318/727 |

FOREIGN PATENT DOCUMENTS

| | | |
|---|---|---|
| EP | 0 802 622 | 10/1997 |
| JP | 3232467 | 11/2001 |
| JP | 2003-348874 | 12/2003 |

OTHER PUBLICATIONS

International Search Report issued Aug. 31, 2007 in the International (PCT) Application of which the present application is the U.S. National Stage.
Written Opinion of the International Searching Authority issued in PCT/JP2007/060561, Form PCT/ISA237, date of mailing Aug. 31, 2007.

* cited by examiner

*Primary Examiner* — Kawing Chan
(74) *Attorney, Agent, or Firm* — Wenderoth, Lind & Ponack, L.L.P.

(57) ABSTRACT

A motor driver according to the invention comprises (i) an energizing unit supplying drive voltage and drive current to a motor including a moving body and coils, (ii) a speed-position detector detecting a drive speed of the motor and a position of the moving body to output a speed position signal including drive-speed information and position information. The motor driver also includes (iii) a reference signal generator outputting a reference signal, (iv) a phase signal generator using the speed-position signal, the reference signal, and a set signal to output a phase signal indicating a phase of the supplied drive voltage, and (v) a waveforms generator using the position information and the phase signal to output a control signal to the energizing unit. A phase of the supplied drive voltage is regulated to be proportional to the drive speed, wherein a degree of the proportion is set by the set signal.

2 Claims, 5 Drawing Sheets

MOTOR DRIVER

BACKGROUND OF THE INVENTION

1. Field of Invention

The invention relates to a motor driver suited to driving a brushless DC motor, etc. used in, for example, air-conditioning equipment, water heaters (on which a fan motor for burning is mounted) air cleaners, and information-processing equipment, such as copying machines, printers, etc. In particular, the invention relates to a motor driver for driving a motor in a sinewave driving system capable of considerably reducing torque ripple, vibration, and noise at the time of motor driving.

2. Description of the Related Art

Brushless DC motors (referred below to as motor) are in many cases used in various driving motors of electrical equipment such as air-conditioning equipment, etc., while merits thereof, such as long life, high reliability, and easiness in speed control are made the most of.

Conventionally, a rectangular-wave driving system, in which a drive voltage supplied to a coil has a rectangular-wave shaped drive waveform, has been widely adopted as a motor driving system. In recent years, however, a request has been increasingly made for driving a motor, such that the motor has low torque ripple, low vibration, and low noise. A sinewave driving system, in which drive voltage supplied to a coil of a motor has a sinewave shaped drive waveform, becomes general as a driving system to meet the above-noted request.

A technique for sinewave driving of a motor is conventionally described in, for example, Japanese Patent Gazette No. 3232467. This conventional motor driver sequentially reads sinewave shaped waveform data stored in a memory according to a rotational position of a motor. The motor driver modulates the waveform data in pulse width to control respective switching elements of an inverter circuit, which supplies electric power to a coil of a motor. In this manner, the conventional motor driver sinewave-drives a motor.

A further technique is described in, for example, Japanese Patent Unexamined Publication No. 2003-348874. This conventional motor driver realizes a sinewave drive technique by using a semiconductor integrated circuit to reduce the number of parts and cost.

FIG. 5 is a circuit structure diagram of a conventional motor driver of this kind. FIG. 6 is a view illustrating an operation of the motor driver shown in FIG. 5.

In FIG. 5, motor 130 includes a moving body (not shown) and three-phase coil 131. Drive voltage and drive current are supplied to coil 131 through a plurality of switching elements provided on energizing unit 120 from a dc power source (not shown).

The motor driver includes controller 110, which includes waveforms generator 114, energizing unit 120, and speed-position detector 140.

Respective information of position and speed of the moving body of the motor are detected by speed-position detector 140 to be transmitted, as output signal RS, to waveforms generator 114 in controller 110. Waveforms generator 114 outputs sinewave-shaped control signals UG, VG, and WG on the basis of the transmitted respective information of position and speed of the moving body. Energizing unit 120 uses control signals UG, VG, and WG to make the respective switching elements ON or OFF, thereby applying drive voltages U, V, and W to coil 131 to supply drive currents Iu, Iv, and Iw thereto.

Control signals UG, VG, and WG are ones having phase difference of electrical angle 120 degrees relative to one another. In order to make the switching elements in energizing unit 120 ON or OFF, such control signals are not limited to three signals but are output as six signals in some cases. As such control signals, signals being modulated in pulse width are used in many cases.

FIG. 6 shows waves of a state of a U-phase coil, that is, output signal RS being an output of speed-position detector 140, drive voltage U and drive current Iu being outputs of energizing unit 120, and induced voltage Eu of the coil.

Waveforms generator 114, into which output signal RS of speed-position detector 140 is input, uses drive-speed information and position information of the moving body, which are included in output signal RS, to output sinewave-shaped drive voltage U. Drive voltage U, induced voltage Eu, and drive current Iu determined by impedance of the coil are supplied from energizing unit 120.

Output signal RS is not necessarily required to be put in a phase relationship, as shown, with drive voltage U and induced voltage Eu, but suffices to be a signal including drive-speed information and position information instead of being rectangular-wave shaped.

While not shown, the relationship among drive voltage, induced voltage, and drive current for V-phase and W-phase is the same as described above.

Motor 130 is sinewave-driven in the above manner.

However, the conventional motor driver described above involves a problem that it is not possible to highly efficiently drive motor 130.

In order to highly efficiently drive a motor, it is necessary to make a phase of drive current, which flows through a coil, and a phase of induced voltage in agreement with each other.

Drive current flowing through a coil assumes a value obtained by dividing voltage, which is obtained by subtracting induced voltage from drive voltage applied to the coil, by impedance of the coil. Impedance of the coil includes inductance component. Therefore, the phase of drive current is behind the phase of drive voltage. Accordingly, in order to highly efficiently drive a motor, taking account of delay of the phase of drive current relative to drive voltage, it is necessary to advance the phase of drive voltage so that the phase of induced voltage and the phase of drive current agree with each other.

Drive voltage of the conventional motor driver shown in FIG. 5 is sinewave-shaped and sinewave is varied in period by drive speed but cannot be advanced in phase. Consequently, as shown in FIG. 6, the conventional motor driver involves a problem that it is not possible to make, for example, induced voltage Eu and drive current Iu in agreement with each other, and so the motor is lowered in drive efficiency.

BRIEF SUMMARY OF THE INVENTION

In order to solve the above-described problem, the invention provides a motor driver comprising an energizing unit including a plurality of switching elements and supplying drive voltage and drive current to a motor, which includes a moving body and three-phase coils, to drive the motor, and a speed-position detector, which detects a drive speed of the motor and a position of the moving body to output, as a speed-position signal, which includes drive-speed information corresponding to the drive speed and position information corresponding to a position of the moving body. The motor driver also includes a reference signal generator, which outputs a reference signal as a reference for the drive speed, a phase signal generator, which uses a speed-position signal of the speed-position detector, a reference signal of the reference signal generator, and a set signal indicative of an optional value to output a phase signal indicative of phase of the drive voltage supplied to the coil, and a waveforms generator, which uses the position information included in a speed-position signal of the speed-position detector and a phase signal of the phase signal generator to output a control signal to the switching elements of the energizing unit. A phase of drive voltage supplied to the coil is regulated so as to be proportional to the drive speed, and degree of the proportion can be set by the set signal.

With the motor driver of the invention, since the phase of drive voltage supplied to the coil is regulated so as to be made proportional to the drive speed and degree of the proportion can be set by the set signal, motors of various specifications can be driven in high efficiency.

When the motor driver of the invention is built in, or integrated with a motor, which includes a moving body and three-phase coils, it is possible to readily construct a high-efficiency driving system, which is easy to assemble into host equipment and includes a sinewave drive motor.

DETAILED DESCRIPTION OF THE INVENTION

An embodiment of the invention will be described below with reference to the drawings.

Figure 1:
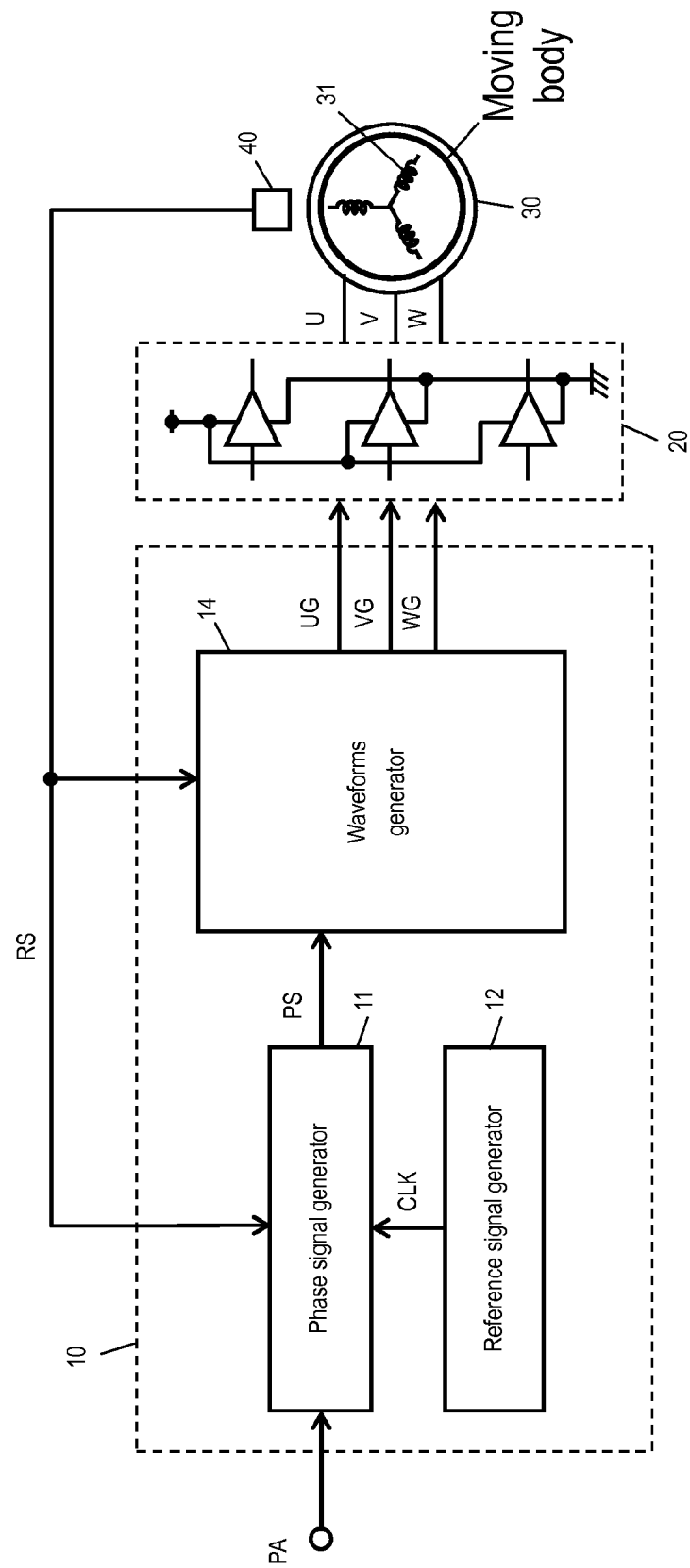
FIG. 1 is a circuit structure diagram of a motor driver according to an embodiment of the invention.
Figure 2:
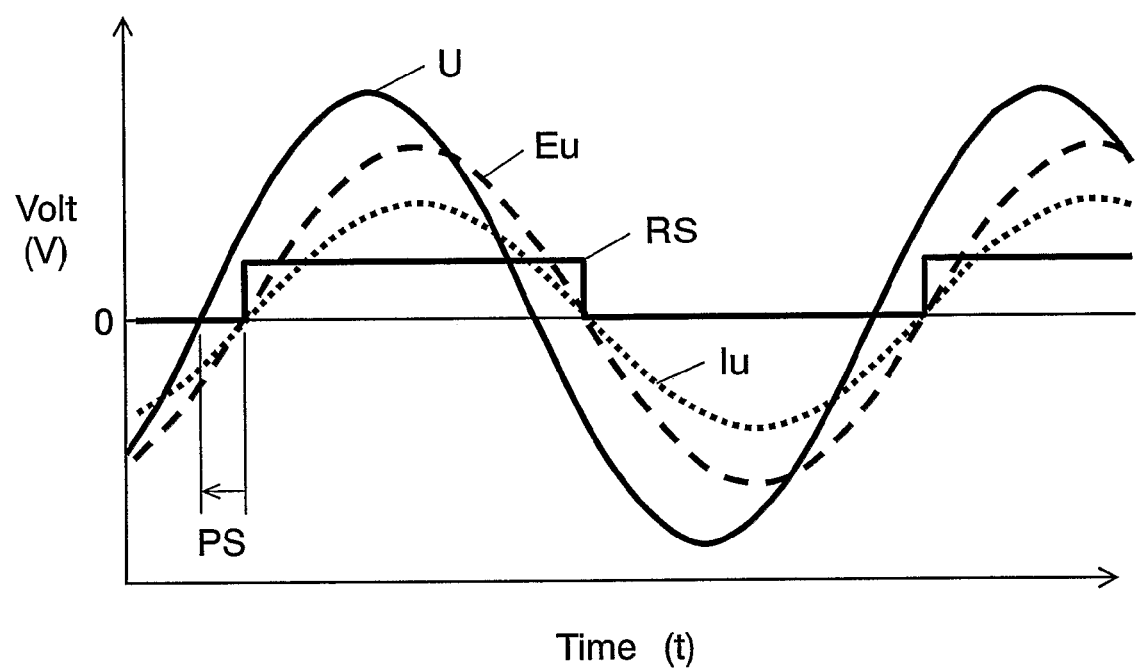
FIG. 2 is a view illustrating an operation of the motor driver according to the embodiment.
Figure 3:
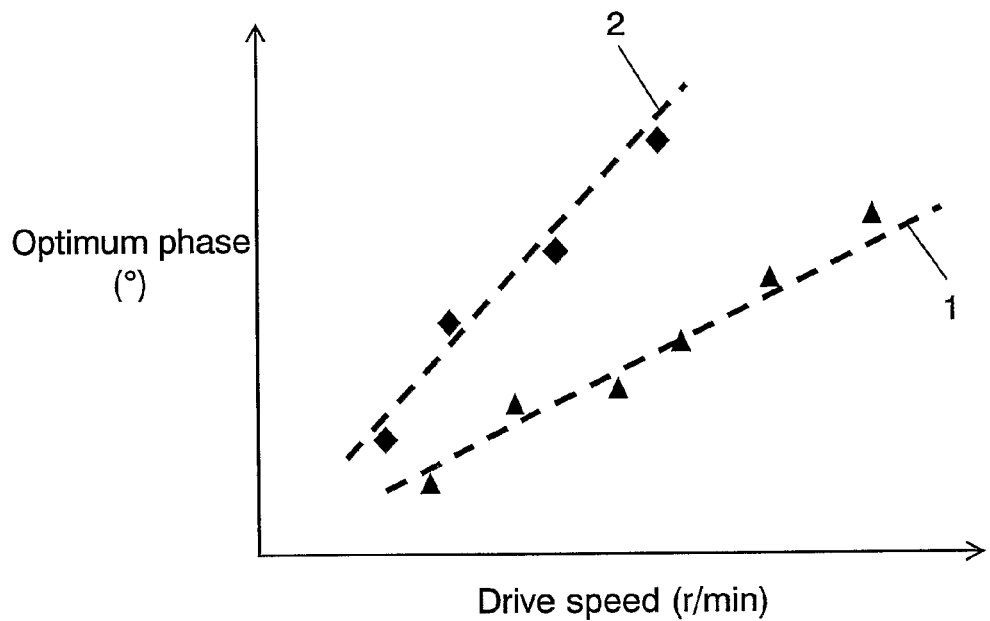
FIG. 3 is a view showing results of measurement of a phase, in which a motor is highest in efficiency relative to drive speed.
Figure 4:
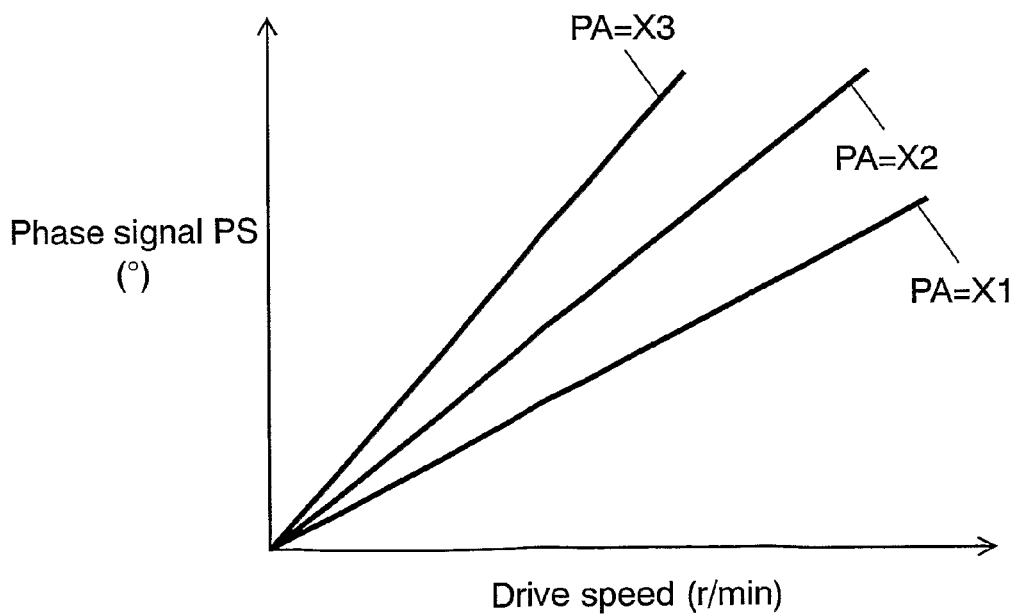
FIG. 4 is a view showing an operation of phase control of the motor driver according to the embodiment of the invention.
Figure 5:
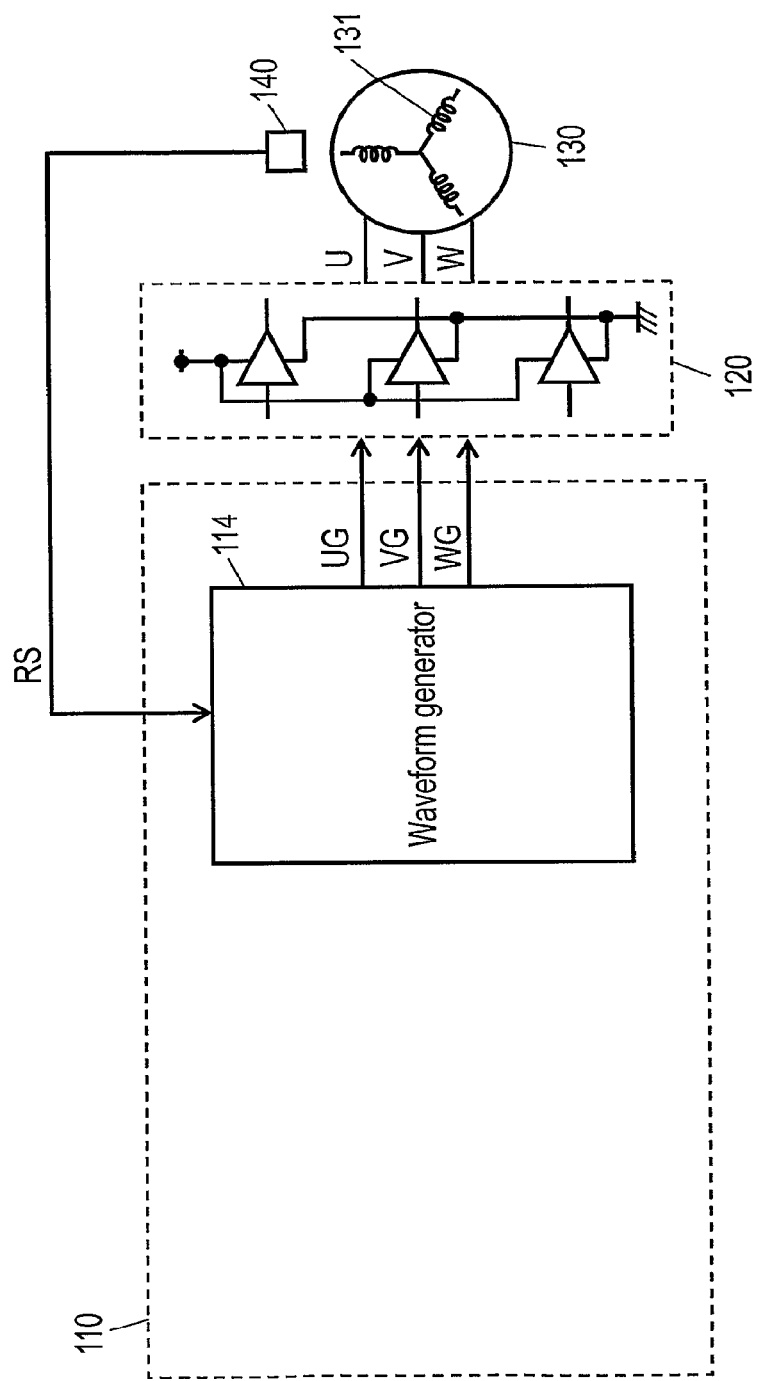
FIG. 5 is a circuit structure diagram of a conventional motor driver.
Figure 6:
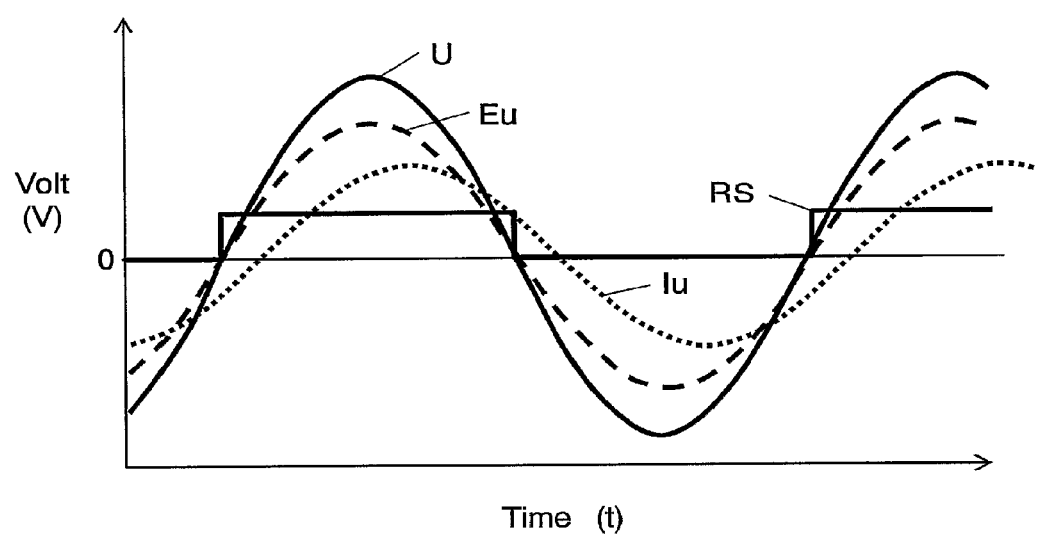
FIG. 6 is a view showing an operation of the conventional motor driver.

FIG. 1 is a circuit structure diagram of a motor driver according to an embodiment of the invention and FIG. 2 is a view illustrating an operation of the motor driver shown in FIG. 1. FIG. 3 is a view showing measurement of phase, in which a motor mounted as a fan motor on air-conditioning equipment becomes highest in efficiency at every drive speed and FIG. 4 is a view showing phase of drive voltage and drive speed of the motor driver according to the invention.

In FIG. 1, motor 30 includes a moving body and three-phase coil 31. Drive voltage and drive current are supplied to coil 31 through a plurality of switching elements provided on energizing unit 20 from a dc power source (not shown).

The motor driver includes controller 10, which includes phase signal generator 11, reference signal generator 12, and waveforms generator 14, energizing unit 20, and speed-position detector 40.

Speed-position detector 40 detects drive speed and a position of the moving body to output a signal, which includes drive speed information corresponding to drive speed and position information corresponding to a position of the moving body, as speed-position signal RS. Respective information of position and speed of the moving body of the motor is transmitted to phase signal generator 11 and waveforms generator 14 in controller 10.

Reference signal generator 12 generates reference signal CLK as a reference for drive speed and outputs the same.

Phase signal generator 11 uses (i) drive speed information of speed-position signal RS from speed-position detector 40, (ii) reference signal CLK from reference signal generator 12, which makes a reference for drive speed, and (iii) set signal PA input as an optional value, so as to generate and output phase signal PS indicative of phase of drive voltage supplied to coil 31.

It is important that in an operation of phase signal generator 11, phase signal PS varies in proportion to drive speed and an extent of the proportion can be set by set signal PA. For example, an operation will do, in which phase signal generator 11 converts drive speed information of speed-position signal RS into a phase signal with reference signal CLK and the set signal PA, such that phase signal PS is proportioned by set signal PA. Phase signal generator 11 may proportionally convert reference signal CLK with set signal PA to convert drive speed information of speed-position signal RS into phase signal, and thus various methods of conversion are conceivable. Set signal PA input as an optional value may be use a voltage value, a pulse signal, etc.

Waveforms generator 14 uses position information included in speed-position signal RS and phase signal PS to generate a control signal to switching elements of energizing unit 20 to output the same to energizing unit 20. That is, waveforms generator 14 generates sinewave-shaped control signals UG, VG, and WG on the basis of phase signal PS and speed-position signal RS to output the same. Energizing unit 20 includes a plurality of switching elements and uses control signals UG, VG, and WG to make the respective switching elements ON or OFF, thereby applying drive voltages U, V, and W to coil 31 to supply drive currents Iu, Iv, and Iw. In this manner, energizing unit 20 drives motor 30.

Control signals UG, VG, and WG have phase differences of electrical angle 120 degrees relative to one another. In order to make the switching elements in energizing unit 20 ON or OFF, such control signals are not limited to three signals but may be, for example, six signals. As such control signals, the motor driver uses signals being modulated in pulse width.

FIG. 2 shows waves of a state of a U-phase coil in the motor driver, that is, speed-position signal RS being an output of speed-position detector 40, drive voltage U and drive current Iu being outputs of energizing unit 20, and induced voltage Eu of the coil.

Waveforms generator 14, into which phase signal PS and speed-position signal RS are input, uses drive-speed information and position information of the moving body, which are included in speed-position signal RS, to generate sinewave-shaped drive voltage U, phase of which is regulated by phase signal PS. Drive voltage U, induced voltage Eu, and drive current Iu determined by impedance of the coil are supplied from energizing unit 20.

In order to highly efficiently drive a motor, it is necessary to regulate the phase of the drive voltage so that the phase of induced voltage Eu and the phase of the drive current Iu agree with each other. Accordingly, an optimum phase of the drive voltage changes when the drive speed of a motor changes. FIG. 3 is a view showing respective measured phases of the drive voltage, at which two kinds of motors 1 and 2 mounted as a fan motor on air-conditioning equipment and having different specifications become highest in efficiency for each drive speed. While drive speed and an optimum phase becoming highest in efficiency are put in a substantially proportioned relationship, it is found that a degree of proportion differs according to the specification of a motor. In the motor driver according to the invention, results of the measurement are taken into consideration and drive speed and phase signal PS are put in a proportioned relationship as shown in FIG. 4. Further, the degree of proportion can be set as illustrated by PA=X1, X2, or X3 by changing set signal PA. Thereby, the motor driver can exercise optimum phase control on motors of various specifications.

Speed-position signal RS should not necessarily be put in a phase relationship as shown with drive voltage U and induced voltage Eu and should not necessarily be rectangular-wave shaped but suffices to be a signal including drive-speed information and position information.

While not shown, the relationship among drive voltage, induced voltage, and drive current in V-phase and W-phase is the same as described above.

In the above manner, motor 30 is sinewave-driven in highest efficiency by the motor driver.

The motor driver is constructed to be able to regulate the phase of the drive voltage being supplied to the coil of the motor to make the same proportional to drive speed and the degree of proportion can be set with a set signal.

Thereby, motors of various specifications can be driven in high efficiency and a high-efficiency driving system, which is easy to assemble into host equipment and includes a sinewave drive motor, can be readily constructed by building or integrating a drive device with a motor.

While a speed position of a moving body of a motor is detected by a method, in which a Hall sensor making use of Hall effect is used, a method, in which induced voltage or drive current generated in a coil is made use of, etc. in case of a brushless DC motor, it suffices that the speed position may be detected by any one of the methods. A waveform of the drive voltage is not necessarily limited to sinewave-shaped waveform shown in FIG. 2 but it suffices consequently that the waveform of the drive voltage applied between respective phase coils be sinewave-shaped. It goes without saying that the drive speed can be controlled by controlling a magnitude of the drive voltage.

While an explanation has been given to the case where waveform of drive voltage is sinewave-shaped, driving of a motor by phase control in highest efficiency is not limited to driving with sinewave-shaped waveform, so that the invention is effective even in driving with rectangular-wave shaped waveform and substantially sinewave-shaped waveform.

INDUSTRIAL APPLICABILITY

Since motors of various specifications can be driven in high efficiency, the invention is suited to driving a fan motor for air-conditioning equipment, of which low vibration, low noise, and high efficiency are requested, and driving a motor used in household electrical appliances, such as water heaters, on which a fan motor for burning is mounted, air cleaners, refrigerators, washers, etc., printers, copying machines, scanners, facsimiles, or complex equipment thereof, or information-processing equipment, such as hard disk, optical medium equipment, etc.

The invention claimed is:

1. A motor driver comprising:
an energizing unit including a plurality of switching elements and supplying a drive voltage and a drive current to a motor including a moving body and a three-phase coil, such that the motor is driven by the drive voltage and the drive current;
a speed-position detector detecting a drive speed of the motor and detecting a position of the moving body of the motor, so as to output a speed-position signal including drive-speed information corresponding to the drive speed and position information corresponding to the position of the moving body;
a reference signal generator outputting a reference signal as a reference for the drive speed;
a phase signal generator outputting a phase signal indicating a phase of the drive voltage supplied to the three-phase coil of the motor, the phase signal being output based on the speed-position signal output by the speed-position detector, the reference signal output by the reference signal generator, and a set signal indicating an optional value; and
a waveforms generator using the position information included in the speed-position signal output by the speed-position detector and the phase signal output by the phase signal generator to output a control signal to the switching elements of the energizing unit,
wherein the phase signal corresponds to a phase difference between a phase indicated by the position information of the speed-position signal and the phase of the drive voltage,
wherein the phase signal generator generates a first phase signal in proportion to the drive speed, generates a second phase signal by proportioning the first phase signal with a value of the set signal, and outputs the second phase signal as the phase signal indicating the phase of the drive voltage,
wherein the value of the set signal is set in correspondence with the specification of the motor, such that the motor achieves a highest efficiency, and
wherein the drive voltage is supplied to the three-phase coil, such that the phase of the drive voltage is proportional to the drive speed in a degree of proportion matching the specification of the motor.

2. A motor comprising the motor driver of claim 1 built or integrated therein.

* * * * *